United States Patent [19]

Waddill

[11] Patent Number: 5,053,465

[45] Date of Patent: Oct. 1, 1991

[54] EPOXY POLYURETHANE POLYUREAS FROM EPOXY RESIN, BLOCKED ISOCYANATE PREPOLYMER AND POLYETHERPOLYAMINE

[75] Inventor: Harold G. Waddill, Austin, Tex.

[73] Assignee: Texaco Chemical Company, White Plains, N.Y.

[21] Appl. No.: 350,728

[22] Filed: May 12, 1989

[51] Int. Cl.$^5$ ............................................. C08L 63/02
[52] U.S. Cl. .................................. 525/528; 525/454
[58] Field of Search ............................... 525/528, 454

[56] References Cited

U.S. PATENT DOCUMENTS

| | | | |
|---|---|---|---|
| 3,963,680 | 6/1976 | O'Keefe et al. | 525/528 |
| 4,552,933 | 11/1985 | Sellstrom et al. | 525/454 |
| 4,605,690 | 8/1986 | DeBroy et al. | 523/414 |
| 4,623,702 | 11/1986 | Grieves et al. | 525/528 |
| 4,704,437 | 11/1987 | Kiessling | 525/528 |

*Primary Examiner*—John C. Bleutge
*Assistant Examiner*—Robert E. L. Sellers, II
*Attorney, Agent, or Firm*—Jack H. Park; Kenneth R. Priem; Cynthia L. Kendrick

[57] ABSTRACT

An epoxy polyurethane.polyurea product having improved impact properties is formed by reacting a curing amount of a polyetherpolyamine such as, for example, an amine terminated ethylene glycol with blends of epoxy resins combined with small amounts of blocked polyoxypropylene polyol/isocyanate.prepolymer. The products of the instant invention exhibit improvements over similar blends cured with other amine curing agents which result in brittle products.

5 Claims, No Drawings

EPOXY POLYURETHANE POLYUREAS FROM EPOXY RESIN, BLOCKED ISOCYANATE PREPOLYMER AND POLYETHERPOLYAMINE

FIELD OF THE INVENTION

This invention relates generally to epoxy curing agents. More particularly, this invention relates to amine curing agents and to novel epoxy polyurethane.-polyurea products having improved properties which are formed by reacting an effective curing amount of a polyetherpolyamine with a blend of epoxy resin and a small amount of blocked polyoxypropylene polyol-/isocyanate prepolymer.

The novel products of the instant invention exhibit improvements over similar blends cured with a variety of other amine curing agents known to result in brittle products. In particular, the use of amine terminated triethylene glycol as an amine curing agent provided low viscosity mixtures resulting in cured products with a very high degree of toughness and at the same time containing only a small amount by weight of blocked isocyanate prepolymer. The cured products are useful for coatings, sealants and encapsulating systems.

BACKGROUND OF THE INVENTION

It is known in the art to cure a blend of epoxy resin and blocked isocyanate prepolymer with an amine. For instance, in Mobay Product Information Bulletin "Desmocap 11A" such cures are described. In the Mobay literature, in an article titled "New Solvent-Free Epoxy/Polyurethane Combinations", Wellner, Gruber and Ruttman disclose information on properties exhibited for systems cured with Laromin C-260, isophorone diamine or trimethylhexamethylene diamine. Cycloaliphatic diamines were described as particularly successful.

A paper generated at the Kelso & Cibulas, SPI-ERF Meeting, Atlanta, Nov. 30, 1983 describes combinations of isocyanate prepolymers blocked with alkyl phenols and liquid epoxy resins which form stable mixtures. Such mixtures were quite reactive with amines. Amines cited were 3,3'-dimethyl-4,4'-diaminocyclohexylmethane (commercially available as Laromin C-260), bis-(aminopropyl)piperazine, a polyglycol diamine and isophorone diamine. Properties given were those obtained with Laromin C-260.

In the related work in the art the products resulting from curing epoxy resin and blocked isocyanate prepolymer blends with amines are brittle materials with few redeeming characteristics. The amine curatives are often hindered amines.

It would be a distinct advantage in the art if a amine component could be used in a curing system which would allow for a product which was not brittle, but very tough and impact resistant and useful for producing flexible coatings, castings and sealants that cure rapidly at ambient temperatures. It would also be advantageous if the amines were effective using only small amounts of isocyanate prepolymer to yield products with desirable properties.

SUMMARY OF THE INVENTION

In accordance with the foregoing the present invention is directed to a polyurethane.polyurea composition which may be cured for extended periods at ambient conditions comprising an epoxy resin/blocked isocyanate prepolymer blend and a curing agent comprising a polyetherpolyamine. It has been surprisingly discovered that improved, desirable properties are observed in the cured product particularly where an amine terminated triethylene glycol is used as the curative of a liquid blend of epoxy resin/blocked isocyanate prepolymer. Further, only small amounts of isocyanate prepolymers are required in order to develop the improved properties. The invention is also a method for curing an epoxy resin/blocked isocyanate prepolymer blend with a polyetherpolyamine.

DETAILED DESCRIPTION

The polyetherpolyamine curatives for the present invention may include several different amines. In general, the polyetherpolyamines may be defined as polyetherpolyamines having one of the following formulas:

1. $H_2NCHCH_2\!-\!\!\!\!+\!OCH_2CH\!\!\!-\!\!\!\!\!+_x\!NH_2$
       |             |
      $CH_3$       $CH_3$
   where x is from 2.6 to 33.1;

2. $H_2NCH_2CH_2(OCH_2CH_2)_x\!-\!NH_2$;
   x = 0,1,2

3. $H_2NCH(CH_3)CH_2\!-\!\!\!\!+\!OCH(CH_3)CH_2\!\!\!-\!\!\!\!\!+_{\overline{x}}\!\!\!-\!\!\!\!\!+\!OCH_2CH_2\!\!\!-\!\!\!\!\!+_{\overline{y}}\!\!\!-\!\!\!\!\!+\!OCH_2CH(CH_3)\!\!\!-\!\!\!\!\!+_{\overline{z}}\!NH_2$.

The polyetherpolyamines used as curing agents of epoxy resins blended with small amounts of blocked polyoxypropylene polyol/isocyanate prepolymer can be either polyoxypropylene or polyoxyethylene amines or combinations of both (See 3, above).

In general, the average molecular weight of a polyoxypropylene diamine curative will be from about 200 to about 6000.

One group of appropriate polyoxyalkylene diamines, containing both ethylene oxide and propylene oxide, which may be used are polyoxypropylene diamines having the formula:

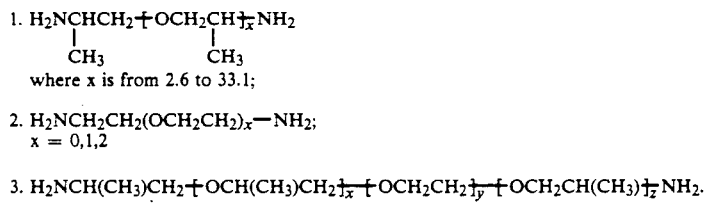

wherein a+c equals a number having a value of from about 2 to about 3 and b is a number having a value of from about 5 to about 45. The preferred amines include polyoxypropylene and polyoxyethylene or a combination thereof.

Suitable polyoxypropylene diamines have the general formula:

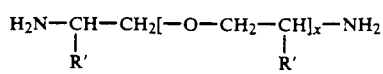

wherein R' independently represents hydrogen or methyl and x is a number having an average value of 2 to 3. Such a polyoxypropylene diamine which is commercially available is JEFFAMINE® D-230 amine produced by Texaco Chemical Company.

Suitable polyoxyethylene amines include those having the formula:

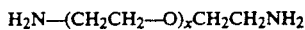

where x = 1, 2 or 3.

The examples demonstrate desirable improvements observed by curing a blend of epoxy resin and blocked polyoxypropylene polyol/isocyanate prepolymer with an amine terminated triethylene glycol having the formula:

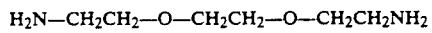

and commercially available as JEFFAMINE® EDR-148 produced by Texaco Chemical Company.

It is quite unexpected that an amine terminated triethylene glycol, such as JEFFAMINE® EDR-148 amine, can be used as a curing agent of epoxy resin blends to obtain materials with improved properties. As the examples will demonstrate a low viscosity mixture having several outstanding properties was observed. For instance, the formulation exhibited a high degree of toughness as indicated by a high value for impact strength when only a small amount of blocked prepolymer was present in the blend.

Typical amines which have been used in the related art for curing epoxy resin/blocked isocyanate blends include Laromin C-260, 3,3'-dimethyl-4,4'-diaminocyclohexylmethane, a hindered cycloaliphatic amine available from BASF. Another recommended curative was bis(aminopropyl)piperazine. As will be demonstrated in the examples, both of the above-mentioned curatives form viscous mixtures and when cured form mixtures which are brittle and without strength.

However, the polyetheramines of this invention, especially JEFFAMINE® D-230 and JEFFAMINE® EDR-148 amine, formed low viscosity mixtures which after curing exhibited improved properties.

When JEFFAMINE® D-230, which is also a hindered amine, was used as a curative of the epoxy resin/blocked isocyanate blend the mixture had low viscosity but was very slow to react, although the properties of the product were desirable. This would indicate usage in areas such as filament winding, potting and encapsulation where an extended working time is necessary.

Quite unexpectedly the JEFFAMINE® EDR-148 resulted in a low viscosity mixture which reacted rapidly and resulted in a product with a very high value for impact strength, indicating a high degree of toughness. An additional desirable property was that it required the presence of only a small amount of blocked prepolymer. Adhesive properties were also improved. Such formulations would be useful in applications such as reaction injection molding, where rapidity of reaction is required.

The epoxy prepolymer blends used in the instant invention comprise blends of epoxy resins with small amounts of blocked polyoxyalkylene polyol/isocyanate prepolymer. The epoxy resin is typically one prepared by the reaction of Bisphenol A with epichlorohydrin in the presence of sodium hydroxide. After condensation is complete, the crude resin is freed of residual epichlorohydrin, washed well to remove salt and soluble by-products and recovered.

Curing of such a resin is accomplished in combination with a blocked isocyanate prepolymer and the polyetherpolyamine of this invention. Preferably the epoxy resin is a liquid. Among those which have demonstrated the effectiveness of the instant invention are diglycidyl ethers of Bisphenol A, such as liquid epoxy resin EEW $\approx$ 185 (EEW = epoxy equivalent weight; molecular weight of resin = $\approx$ 380; functionality $\approx$ 2; equivalent weight $\approx$ 185-190.

The blocked isocyanate prepolymer used in the instant invention comprises a polyoxyalkylene polyol/isocyanate prepolymer blocked with a phenol.

The blocked isocyanates used contain an average of 2-6, preferably about 2-4 blocked isocyanate groups per molecule and may be prepared from almost any organic polyisocyanate. It is preferred to use aromatic polyisocyanates such as the alkarylene polyisocyanates, e.g., 4,4'-diphenylene methane; 2,4 or 2,6 toluene or mixtures thereof; or 4,4'-toluidine or 1,4-xylylene diisocyanates.

Particularly preferred are the commercially available aliphatic, cycloaliphatic and aromatic diisocyanates. Blockage of the free isocyanate groups should be with phenol or preferably with an alkylated phenol. The use of a polyoxy propylene polyol/toluene diisocyanate reaction product blocked with nonylphenol is demonstrated in the examples.

In the instant invention only small amounts of isocyanate prepolymer are needed in order to develop enhanced properties. The amount of isocyanate prepolymer in the instant invention is from 5 to 50% by total weight of epoxy resin blocked isocyanate prepolymer blend. Less than 30% of isocyanate prepolymer by weight of total epoxy resin blocked isocyanate prepolymer blend is required. The examples demonstrate that the enhanced properties can be produced using 10 to 30% by weight of isocyanate prepolymer.

Practice of the novel method of this invention may be apparent from the description in Examples 1 through 7.

Examples 1 through 3 compare the polyetherpolyamine curatives with other amines used in the art. Examples 4-7 focus more on the particularly desirable properties obtained using amine terminated triethylene glycol.

The novel use of the non-hindered amine terminated triethylene glycol as a curative provides for the production of low viscosity mixtures which react rapidly to form materials exhibiting a high degree of toughness and improved adhesive properties. Uses for these products will be readily apparent to those skilled in the art and such products should be especially desirable in applications such as reaction injection molding because of the rapidity of reaction observed.

In the Examples of this invention the preparation of the cured resin blend is carried out in the following manner: The epoxy resin/blocked isocyanate prepolymer blend is reacted in a solvent free system with the polyetherpolyamine to provide solvent free unplasticized flexible compositions. After the amine curing agent is added, the mixture is mixed, degassed and poured into molds. Curing is for an extended period at ambient conditions.

In the various Examples the following properties are measured:

Tensile Shear Strength, psi - ASTM D1002
Brookfield viscosity, cps, ≈23° C. - ASTM D1824
Gel time, mins. - ASTM D2471
(200 g mass)
Rheometric Impact - High rate impact test - simulates actual impact failures at high speeds (Rheometrics).
Tensile Strength, psi - ASTM D638 - The rupture strength (stress/strain product at break) per unit area of material subjected to a specific dynamic load.
T-peel strength - ASTM D1876 - determines relative peel resistance of adhesive bond between flexible adherents.
Tensile modulus, psi - ASTM D638  $\frac{\text{Stress (psi)}}{\text{Strain (in/in.)}}$
Flexural strength, psi - A measure of the ability of a material to withstand failure due to bending. ASTM D790
Flexural modulus, psi - Stress/strain. ASTM D790

It will be noted from Example 1 that Laromin C-260, which is a hindered amine, formed a viscous mixture that was slow to react with the epoxy blocked prepolymer. When cured for an extended period under ambient conditions, the mixture was brittle and without strength. Another recommended curative [bis(aminopropyl)piperazine] also produced a viscous mixture but was quite reactive and cured the blend to form a casting with adequate but somewhat brittle properties. JEFFAMINE® D-230, also a hindered amine, formed a low viscosity mixture with the epoxy blocked isocyanate blend but was very slow to react. Again, adequate properties were obtained. Quite unexpectedly, curing with a non-hindered polyetherpolyamine, JEFFAMINE® EDR-148 resulted in a low viscosity reactive mixture with several outstanding properties. A very high value for impact strength was found for this formulation indicating a high degree of toughness with only a small amount of blocked prepolymer present in the system. Adhesive properties of this formulation were also considerably improved over others of the series.

The Examples are given only in the way of illustration and are not to be regarded as limiting the invention.

EXAMPLE 1

| Properties: Epoxy Resin/Blocked Isocyanate Prepolymer Blend (90/10 pbw) Cured With Various Amines | | | | |
|---|---|---|---|---|
| 6297 Formulation: | -17B | -62B | -19B | -4A |
| Liquid epoxy resin (EEW ≈ 185) | 90 | 90 | 90 | 90 |
| Blocked prepolymer[1] | 10 | 10 | 10 | 10 |
| 3,3'-Dimethyl-4,4'-diaminocyclohexylmethane[2] | 30 | — | — | — |
| Bis(3-Aminopropyl)-piperazine (BAPP) | — | 23 | — | — |
| Polyoxypropyleneamine (MW ≈ 230)[3] | — | — | 28 | — |
| Triethylene glycol diamine[4] | — | — | — | 18 |
| Exothermic Properties: | | | | |
| Brookfield viscosity, cps, ≈23° C. | 8500 | 4300 | ≈2000 | 1200 |
| Gel time, mins. (200 g mass) | ≈90[7] | 30.0 | ≈258[7] | 36.4 |
| Peak exothermic temperature, °C. | 115.0 | 219.5 | 33 | 236.5 |
| Time to peak temperature, mins. | 190 | 39.0 | 414 | 39.7 |
| Properties of Cured ⅛ in. Castings[5]: | 6 | | | |
| Rheometrics impact, total energy, in-lbs. | | 4 | 15 | 126 |
| Tensile strength, psi | | 8100 | 8700 | 8800 |

| Properties: Epoxy Resin/Blocked Isocyanate Prepolymer Blend (90/10 pbw) Cured With Various Amines | | | | |
|---|---|---|---|---|
| 6297 Formulation: | -17B | -62B | -19B | -4A |
| Tensile modulus, psi | | 344000 | 408000 | 414000 |
| Elongation at break, % | | 2.7 | 3.3 | 3.2 |
| Flexural strength, psi | | 13600 | 14700 | 14300 |
| Flexural modulus, psi | | 404000 | 416000 | 420000 |
| HDT, °C., 264 psi/66 psi | | 57/58 | 44/47 | 48/50 |
| Adhesive Properties[5]: | 8 | | | |
| Tensile shear strength, psi | | 1300 | 1400 | 3050 |
| T-peel strength, pli | | 3.5 | 5.1 | 9.4 |

[1]Polyoxypropylene polyol/TDI reaction product block with nonylphenol; Desmocap 11A (Mobay Chemical Corp.)
[2]Laromin C-260 (BASF)
[3]JEFFAMINE® D-230
[4]JEFFAMINE® EDR-148
[5]Cured 14 days, ≈23° C.
[6]Casting brittle; without strength. Shattered on removal from mold
[7]Time to reach 10,000 cps
[8]Brittle adhesive bond. Fractured before testing. No properties could be determined.

In Example 2, using 20 parts by weight blocked isocyanate prepolymer per total epoxy resin the trends in the data were similar to those found in Example 1. Laromin C-260 formed a brittle unsatisfactory casting. BAPP produced a viscous, reactive mixture with satisfactory properties. JEFFAMINE® D-230 was slow to react, but produced overall good properties. JEFFAMINE® EDR-148 again produced superior properties in several areas. The formulation exhibited low viscosity, was quite reactive, and had outstanding impact resistance and good adhesion properties.

EXAMPLE 2

| Properties: Epoxy Resin/Blocked Isocyanate Prepolymer Blend (80/20 pbw) Cured With Various Amines | | | | |
|---|---|---|---|---|
| 6297 Formulation: | -15A | -62C | -19C | -6A |
| Liquid epoxy resin (EEW ≈ 185) | 80 | 80 | 80 | 80 |
| Blocked prepolymer[1] | 20 | 20 | 20 | 20 |
| 3,3'-Dimethyl-4,4'-diaminocyclohexylmethane[2] | 27 | — | — | — |
| Bis(3-Aminopropyl)-piperazine (BAPP) | — | 23 | — | — |
| Polyoxypropyleneamine (MW ≈ 230)[3] | — | — | 26 | — |
| Triethylene glycol diamine[4] | — | — | — | 17 |
| Exothermic Properties: | | | | |
| Brookfield viscosity, cps, ≈23° C. | 10000 | 5000 | 2500 | 2000 |
| Gel time, mins. (200 g mass) | 70–75 | 18.5 | 200[7] | 17.9 |
| Peak exothermic temperature, °C. | 129.2 | 208.5 | 80 | 220.2 |
| Time to peak temperature, mins. | 102.0 | 21.0 | 350 | 26.0 |
| Properties of Cured ⅛ in. Castings[5]: | 6 | | | |
| Rheometrics impact, total energy, in-lbs. | — | 89 | | 144 |
| Tensile strength, psi | | 7000 | 6200 | 6400 |
| Tensile modulus, psi | | 533000 | 269000 | 306000 |
| Elongation at break, % | | 6.6 | 7.5 | 5.7 |
| Flexural strength, psi | | 10800 | 10300 | 10100 |
| Flexural modulus, psi | | 310000 | 311000 | 307000 |
| HDT, °C., 264 psi/66 psi | | 53/56 | 44/46 | 44/47 |
| Adhesive Properties[5]: | 8 | | | |
| Tensile shear strength, psi | | 2300 | 2800 | 3000 |

-continued

Properties: Epoxy Resin/Blocked Isocyanate Prepolymer Blend (80/20 pbw) Cured With Various Amines

| 6297 Formulation: | -15A | -62C | -19C | -6A |
|---|---|---|---|---|
| T-peel strength, pli | | 7.2 | 5.3 | 6.4 |

[1] Polyoxypropylene polyol/TDI reaction product block with nonylphenol; Desmocap 11A (Mobay Chemical Corp.)
[2] Laromin C-260 (BASF)
[3] JEFFAMINE ® D-230
[4] JEFFAMINE ® EDR-148
[5] Cured 14 days, ≈23° C.
[6] Casting brittle; without strength. Shattered on removal from mold
[7] Time to reach 10,000 cps [8] Brittle adhesive bond. Fractured before testing. No properties could be determined.
[8] Brittle adhesive bond. Fractured before testing. No properties could be determined.

In Example 3, containing 30% blocked isocyanate, Laromin C-260 again formed a viscous mixture of low reactivity with the blend. However, using this percentage of prepolymer, brittleness of the casting had decreased so that properties could be obtained. A degree of brittleness remained, as evidenced by the casting's elongation, impact and peel strength. The highly reactive amine, BAPP, formed a viscous mass which was difficult to process. No properties could be obtained with this formulation. Either of the polyetheramines, JEFFAMINE ® D-230 or JEFFAMINE ® EDR-148, produced flexible castings with superior properties of elongation, impact and peel strength.

JEFFAMINE ® D-230, even in the presence of 30% blocked isocyanate, was slow to react, indicating usage in application areas such as filament winding, potting and encapsulation where an extended working time is necessary. Rapid reaction was shown by the formulation cured with JEFFAMINE ® EDR-148. Such systems would find other applications where rapidity of reaction is required, i.e. reaction injection molding.

EXAMPLE 3

Properties: Epoxy Resin/Blocked Isocyanate Prepolymer Blend (70/30 pbw) Cured With Various Amines

| 6297 Formulation: | -15B | -62D | -19D | -6B |
|---|---|---|---|---|
| Liquid epoxy resin (EEW ≈ 185) | 70 | 70 | 70 | 70 |
| Blocked prepolymer[1] | 30 | 30 | 30 | 30 |
| 3,3'-Dimethyl-4,4'-diamino-cyclohexylmethane[2] | 26 | — | — | — |
| Bis(3-Aminopropyl)-piperazine (BAPP) | — | 19 | — | — |
| Polyoxypropyleneamine (MW ≈ 230)[3] | — | — | 23 | — |

-continued

Properties: Epoxy Resin/Blocked Isocyanate Prepolymer Blend (70/30 pbw) Cured With Various Amines

| 6297 Formulation: | -15B | -62D | -19D | -6B |
|---|---|---|---|---|
| Triethylene glycol diamine[4] | — | — | — | 14 |
| Exothermic Properties: | | | | |
| Brookfield viscosity, cps, ≈23° C. | 19000 | 15000 | ≈4500 | 3800 |
| Gel time, mins. (200 g mass) | ≈75 | 15.7 | ≈108 | 9.5 |
| Peak exothermic temperature, °C. | 96 | 187.5 | 57 | 188.5 |
| Time to peak temperature, mins. | 114 | 21.5 | 198 | 24.0 |
| Properties of Cured ¼ in. Castings[5]: | | 6 | | |
| Rheometrics impact, total energy, in-lbs. | 4 | | 263 | 160 |
| Tensile strength, psi | 2100 | | 3600 | 3900 |
| Tensile modulus, psi | 224000 | | 173000 | 182000 |
| Elongation at break, % | 1.0 | | 47 | 21.7 |
| Flexural strength, psi | 7850 | | 6300 | 6900 |
| Flexural modulus, psi | 222000 | | 189000 | 189000 |
| HDT, °C., 264 psi/66 psi | 45/49 | | 38/42 | 40/43.5 |
| Adhesive Properties[5]: | | | | |
| Tensile shear strength, psi | 2200 | | 2200 | 2600 |
| T-peel strength, pli | 1.8 | | 5.7 | 7.7 |

[1] Polyoxypropylene polyol/TDI reaction product block with nonylphenol; Desmocap 11A (Mobay Chemical Corp.)
[2] Laromin C-260 (BASF)
[3] JEFFAMINE ® D-230
[4] JEFFAMINE ® EDR-148
[5] Cured 14 days, ≈23° C.
[6] Gelled while transferring to mold. No properties were determined.

Example 4 demonstrates curing with an unhindered polyetheramine (JEFFAMINE ® EDR-148 from Texaco Chemical Company) which resulted in rapid curing of relatively low viscosity systems. Formulations which contained >39% blocked prepolymer were quite reactive and difficult to process. However, properties of formulations containing only small amounts of prepolymer were considerably improved in several important areas over a formulation containing no prepolymer. Rheometrics impact values were vastly improved with just the smallest amounts of prepolymer present. Strength and modulus values declined with increased prepolymer while elongation and adhesion values increased. Toughening of the product as shown with small amounts of prepolymer was accomplished with retention of a high percentage of original physical properties.

EXAMPLE 4

Properties: Curing Epoxy Resin/Blocked Isocyanate Prepolymer Blends With Triethylene Glycol Diamine (JEFFAMINE ® EDR-148)

| Formulation: | 6357 58C | -4A | -4B | -6A | -6B | -6C | -6D |
|---|---|---|---|---|---|---|---|
| Epoxy resin[1]/Blocked prepolymer[2], pbw | | | | | | | |
| 100/0 | 100 | — | — | — | — | — | — |
| 95/5 | — | 100 | — | — | — | — | — |
| 90/10 | — | — | 100 | — | — | — | — |
| 80/20 | — | — | — | 100 | — | — | — |
| 70/30 | — | — | — | — | 100 | — | — |
| 60/40 | — | — | — | — | — | 100 | — |
| 50/50 | — | — | — | — | — | — | 100 |
| JEFFAMINE ® EDR-148 | 20 | 20 | 18 | 17 | 14 | 12 | 11 |
| Brookfield viscosity, cps, 25° C. | 700 | 1000 | 1200 | 2000 | 3800 | 6800 | 10000 |
| Gel time, mins. | 55.5 | 51.6 | 36.4 | 17.9 | 9._ | 4 | 4 |

-continued

Properties: Curing Epoxy Resin/Blocked Isocyanate Prepolymer Blends With Triethylene Glycol Diamine (JEFFAMINE ® EDR-148)

| Formulation: | 6357 58C | -4A | -4B | -6A | -6B | -6C | -6D |
|---|---|---|---|---|---|---|---|
| (200 g mass) | | | | | | | |
| Peak exothermic temp., °C. | 242.0 | 237.8 | 236.5 | 220.2 | 188.5 | 155.8 | 138.2 |
| Time to peak temperature, mins. | 63.0 | 57.0 | 39.7 | 26.0 | 24.0 | 22.5 | 25.0 |
| Properties of cured ¼ in. castings[3]: | | | | | | 4 | 4 |
| Rheometrics impact, total energy, in-lbs. | 11 | 158 | 126 | 144 | 160 | | |
| Tensile strength, psi | 9600 | 8500 | 8800 | 6400 | 3900 | | |
| Tensile modulus, psi | 441000 | 406000 | 414000 | 306000 | 182000 | | |
| Elongation at break, % | 3.4 | 3.0 | 3.2 | 5.7 | 21.7 | | |
| HDT, °C., 264 psi/66 psi | 51/53 | 51/52 | 48/50 | 44/47 | 40/43.5 | | |
| Adhesive Properties[3] | | | | | | | |
| Tensile shear strength, psi | 1400 | 1900 | 3050 | 3000 | 2600 | 1800 | 1200 |
| T-peel strength, pli | 0.9 | 5.1 | 9.4 | 6.4 | 7.7 | 13.0 | 25.4 |

[1]Liquid epoxy resin of equivalent weight 185-192
[2]Blocked isocyanate prepolymer; Desmocap 11A, Mobay Chemical Co.
[3]Cured 14 days, 25° C.
[4]Material gelled while degassing; could not prepare samples Example 5 demonstrates the use of Laromin C-260 as a curative of similar formulations which formed viscous mixtures that were difficult to process and did not cure rapidly. Castings cured with Laromin C-260 were brittle and without strength. Large amounts of prepolymer were necessary to reduce brittleness to an acceptable, testable level. Formulations which contained these large amounts of prepolymer were extremely viscous and quite difficult to process BAPP (Example 6) also formed brittle castings with small amounts of prepolymer present but cured so rapidly with larger amounts of prepolymer so that processing was difficult. JEFFAMINE ® D-230 (Example 7) reacted slowly with epoxy/prepolymer blends in contrast to rapid curing with EDR-148. Properties obtained on curing with D-230 were satisfactory. Enhancement of impact and adhesion properties developed with large amounts of prepolymer present in the formulation.

EXAMPLE 5

Properties: Curing Epoxy Resin/Blocked Isocyanate Prepolymer Blends With 3,3'-Dimethyl-4-4,4'-Diaminocyclohexylmethane

| Formulation: | 6297-97B | 17A | 17B | 15A | 15B | 15C | 15D |
|---|---|---|---|---|---|---|---|
| Epoxy resin[1]/Blocked prepolymer[2], pbw | | | | | | | |
| 100/0 | 100 | — | — | — | — | — | — |
| 95/5 | — | 100 | — | — | — | — | — |
| 90/10 | — | — | 100 | — | — | — | — |
| 80/20 | — | — | — | 100 | — | — | — |
| 70/30 | — | — | — | — | 100 | — | — |
| 60/40 | — | — | — | — | — | 100 | — |
| 50/50 | — | — | — | — | — | — | 100 |
| 3,3'-Dimethyl(4,4'-diaminocyclohexylmethane[3] | 34 | 32 | 30 | 27 | 26 | 24 | 20 |
| Brookfield viscosity, cps, 25° C. | 7000 | | 8500 | 10000 | 19000 | | 31000 |
| Gel time, mins. (200 g mass) | 210 | 90 | 70-75 | 75 | | | 6 |
| Peak exothermic temp., °C. | 127 | | 115 | 129.2 | 96 | | |
| Time to peak temperature, mins. | 240 | | 190 | 102 | 114 | | |
| Properties of cured ¼ in. castings[4]: | 5 | 5 | 5 | 5 | | 7 | 7 |
| Rheometrics impact, total energy, in-lbs. | | | | | 4 | | |
| Tensile strength, psi | | | | | 2100 | | |
| Tensile modulus, psi | | | | | 224000 | | |
| Elongation at break, % | | | | | 1.0 | | |
| HDT, °C., 264 psi/66 psi | | | | | 45/49 | | |
| Adhesive Properties[4] | | | | | | | |
| Tensile shear strength, | | | | | 2200 | 2600 | 1600 |

-continued

Properties: Curing Epoxy Resin/Blocked Isocyanate Prepolymer Blends With 3,3'-Dimethyl-4-4,4'-Diaminocyclohexylmethane

| Formulation: | 6297-97B | 17A | 17B | 15A | 15B | 15C | 15D |
|---|---|---|---|---|---|---|---|
| T-peel strength, pli | | | | 1.8 | 6.6 | 6.5 | |

[1] Liquid epoxy resin of equivalent weight 185-192
[2] Blocked isocyanate prepolymer; Desmocap 11A, Mobay Chemical Co.
[3] Laromin C-260; BASF Corp., Chemicals Division
[4] Cured 14 days, 25° C.
[5] Brittle castings, without strength. Could not determine properties.
[6] Viscous mixture; could not determine time of gellation.
[7] Material gelled while degassing; could not prepare castings.

EXAMPLE 6

Properties: Curing Epoxy Resin/Blocked Isocyanate Prepolymer Blends With Bis(3-Aminopropyl)Piperazine (BAPP)

| Formulation: | 6297 97A | 62A | 62B | 62C | 62D |
|---|---|---|---|---|---|
| Epoxy resin[1]/Blocked prepolymer[2], pbw | | | | | |
| 100/0 | 100 | — | — | — | — |
| 95/5 | — | 100 | — | — | — |
| 90/10 | — | — | 100 | — | — |
| 80/20 | — | — | — | 100 | — |
| 70/30 | — | — | — | — | 100 |
| Bis(3-Aminopropyl) Piperazine | 27 | 25 | 23 | 23 | 19 |
| Brookfield viscosity, cps, 25° C. | 2200 | 2300 | 4300 | 5000 | 15000 |
| Gel time, mins. (200 g mass) | 59.6 | 29.5 | 30.0 | 18.5 | 15.7 |
| Peak exothermic temp., °C. | 222.5 | 223.5 | 219.5 | 208.5 | 187.5 |
| Time to peak temperature, mins. | 65.6 | 36.5 | 39.0 | 21.0 | 21.5 |
| Properties of cured ⅛ in. castings[3]: | | 5 | | | 6 |
| Rheometrics impact, total energy, in-lbs. | 6 | 2 | 4 | — | |
| Tensile strength, psi | 1300 | 8100 | 7000 | | |
| Tensile modulus, psi | 536000 | | 344000 | 533000 | |
| Elongation at break, % | 2.3 | | 2.78 | 6.6 | |
| HDT, °C., 264 psi/66 psi | — | | | 57/58 | 53/56 |
| Adhesive Properties[3] | | | | | |
| Tensile shear strength, psi | 4 | 800 | 1300 | 2300 | 2700 |
| T-peel strength, pli | 4 | 4 | 3.5 | 7.2 | 7.2 |

[1] Liquid epoxy resin of equivalent weight 185-192
[2] Desmocap 11A, Mobay Chemical Company
[3] Cured 14 days, 25° C.
[4] Sample broke before testing - no properties were determined.
[5] Casting was brittle and without strength - could not determine properties.
[6] Gelled while pouring into mold - no properties were determined.

EXAMPLE 7

Properties: Curing Epoxy Resin/Blocked Isocyanate Prepolymer Blends With a Hindered Polyether Diamine (JEFFAMINE ® D-230)

| Formulation: | 6357-58D | 6297-19A | 19B | 19C | 19D |
|---|---|---|---|---|---|
| Epoxy resin[1]/Blocked prepolymer[2], pbw | | | | | |
| 100/0 | 100 | — | — | — | — |
| 95/5 | — | 100 | — | — | — |
| 90/10 | — | — | 100 | — | — |
| 80/20 | — | — | — | 100 | — |
| 70/30 | — | — | — | — | 100 |
| JEFFAMINE ® D-230 | | | | | |
| Brookfield viscosity, cps, 25° C. | 2200 | 2300 | 4300 | 5000 | 15000 |

-continued

Properties: Curing Epoxy Resin/Blocked Isocyanate Prepolymer Blends With a Hindered Polyether Diamine (JEFFAMINE ® D-230)

| Formulation: | 6357-58D | 6297-19A | 19B | 19C | 19D |
|---|---|---|---|---|---|
| Gel time, mins. (200 g mass) | 280[4] | 312[4] | 258[4] | 200[4] | 108 |
| Peak exothermic temp., °C. | 64 | 32 | 33 | 80 | 57 |
| Time to peak temperature, mins. | 396 | 366 | 414 | 350 | 198 |
| Properties of cured ⅛ in. castings[3]: | | | | | |
| Rheometrics impact, total energy, in-lbs. | 12 | 19 | 15 | 89 | 263 |
| Tensile strength, psi | 6600 | 9000 | 8700 | 6200 | 3600 |
| Tensile modulus, psi | 417000 | 430500 | 408000 | 269000 | 173000 |
| Elongation at break, % | 1.5 | 2.5 | 3.3 | 7.5 | 47 |
| HDT, °C., 264 psi/66 psi | 43/46 | 48/48 | 44/47 | 44/46 | 38/42 |
| Adhesive Properties[3] | | | | | |
| Tensile shear strength, psi | 900 | 1100 | 1400 | 2800 | 2200 |
| T-peel strength, pli | 3.9 | 4.6 | 5.1 | 5.3 | 5.7 |

[1] Liquid epoxy resin of equivalent weight 185-192
[2] Desmocap 11A, Mobay Chemical Company
[3] Cured 14 days, 25° C.
[4] Time to reach viscosity of 10,000 cps

What is claimed is:

1. A composition cured at ambient temperatures comprising a blend of 70% to 90% of a epoxy resin with 10% to 30%, by weight of the total epoxy resin/blocked isocyanate prepolymer blend, of a polyoxyalkylene polyol/isocyanate prepolymer blocked with an alkylated phenol and an effective curing amount of a polyetherpolyamine selected from the group consisting of a polyoxypropylenediamine having the formula:

$$H_2NCH(CH_3)CH_2[OCH_2CH(CH_3)]_xNH_2$$

wherein x is a number having an average value of 2 to 3 and an amine terminated polyethylene glycol having the formula:

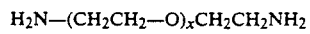

$$H_2N-(CH_2CH_2-O)_xCH_2CH_2NH_2$$

where x=2.

2. The composition of claim 1 wherein the polyetherpolyamine has the formula:

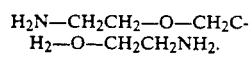

$$H_2N-CH_2CH_2-O-CH_2CH_2-O-CH_2CH_2NH_2.$$

3. A process for curing a blend of 70% to 90% of a epoxy resin and 10% to 30%, by weight of the total epoxy resin/blocked isocyanate prepolymer blend, of a polyoxyalkylene polyol/isocyanate prepolymer blocked with an alkylated phenol which comprises adding to the blend an effective curing amount of a polyetherpolyamine selected from the group consisting of a polyoxypropylenediamine having the formula:

H₂NCH(CH₃)CH₂[OCH₂CH(CH₃)]ₓNH₂ wherein x is a number having an average value of 2 to 3 and an amine terminated polyethylene glycol having the formula:

H₂N—(CH₂CH₂—O)ₓCH₂CH₂NH₂ where x=2 and curing at ambient temperatures.

4. The process of claim 3 wherein the polyetherpolyamine has the formula:

H₂N—CH₂CH₂—O—CH₂CH₂—O—CH₂CH₂NH₂.

5. A composition cured at ambient temperatures comprising:
- 70–95 parts by weight of a epoxy resin having an epoxy equivalent weight of about 185;
- 5–30 parts by weight of a polyoxyalkylene polyol/isocyanate prepolymer blocked with an alkylated phenol; and
- a curing amount of amine terminated triethylene glycol.

* * * * *